(12) United States Patent
Roesch

(10) Patent No.: US 8,170,728 B2
(45) Date of Patent: May 1, 2012

(54) ROTORCRAFT CONTROL SYSTEM

(75) Inventor: Philippe Roesch, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 969 days.

(21) Appl. No.: 12/120,662

(22) Filed: May 15, 2008

(65) Prior Publication Data

US 2008/0294305 A1 Nov. 27, 2008

(30) Foreign Application Priority Data

May 22, 2007 (FR) .................................... 07 03616

(51) Int. Cl.
*G01C 23/00* (2006.01)
(52) U.S. Cl. ...................................... 701/3; 701/4; 244/6
(58) Field of Classification Search .................. 701/3, 7; 244/6, 8, 34 R
See application file for complete search history.

(56) References Cited

U.S. PATENT DOCUMENTS

| | | | | |
|---|---|---|---|---|
| 4,730,795 A * | 3/1988 | David | ................................ | 244/6 |
| 5,023,793 A * | 6/1991 | Schneider et al. | ............ | 701/100 |
| 5,715,162 A * | 2/1998 | Daigle | ............................ | 701/99 |
| 5,839,691 A * | 11/1998 | Lariviere | ...................... | 244/7 R |
| 5,997,250 A * | 12/1999 | Carter et al. | ..................... | 416/27 |
| 6,004,098 A * | 12/1999 | Chevallier et al. | .............. | 416/30 |
| 6,471,158 B1 * | 10/2002 | Davis | ................................ | 244/8 |
| 7,147,182 B1 * | 12/2006 | Flanigan | ............................ | 244/6 |
| 7,168,656 B2 * | 1/2007 | Pai | ............................. | 244/17.23 |
| 7,448,571 B1 * | 11/2008 | Carter et al. | ................ | 244/17.25 |
| 7,496,433 B1 * | 2/2009 | Marze | ................................ | 701/5 |
| 7,756,612 B2 * | 7/2010 | Salesse-Lavergne | ............. | 701/4 |
| 2002/0011539 A1 * | 1/2002 | Carter, Jr. | ......................... | 244/6 |
| 2004/0010354 A1 * | 1/2004 | Nicholas et al. | .................. | 701/4 |
| 2004/0069901 A1 * | 4/2004 | Nunnally | ..................... | 244/34 R |
| 2005/0165516 A1 * | 7/2005 | Haissig et al. | ..................... | 701/4 |
| 2006/0231675 A1 * | 10/2006 | Bostan | .......................... | 244/12.1 |
| 2006/0287778 A1 * | 12/2006 | Oltheten et al. | ................... | 701/1 |
| 2007/0164167 A1 * | 7/2007 | Bachelder et al. | ............ | 244/220 |
| 2008/0006739 A1 * | 1/2008 | Mochida et al. | ................ | 244/60 |
| 2008/0161983 A1 * | 7/2008 | Salesse-Lavergne | ............. | 701/7 |
| 2009/0043431 A1 * | 2/2009 | Marze | ................................ | 701/5 |
| 2009/0048722 A1 * | 2/2009 | Piasecki et al. | .................... | 701/3 |

* cited by examiner

Primary Examiner — Helal A Algahaim
(74) Attorney, Agent, or Firm — Brooks Kushman P.C.

(57) ABSTRACT

A system (100) for controlling a rotorcraft (1) including a rotor (10), at least one variable-pitch propulsion propeller (6L, 6R), and a motor (5) for driving the rotor and the propeller(s), the system includes:

- a member (101, 101A, 102, 103, 104) for generating a propeller pitch setpoint ($\theta_p^* + \theta_d^*$, $\theta_p^* - \theta_d^*$) as a function at least of a thrust variation command (TCL);
- a member (105, 105A) for generating a setpoint (RPM*) for the drive speed (RPM) of the rotor and the propeller(s), as a function at least of the travel speed (VTAS) of the rotorcraft; and
- a member (106) for generating a setpoint (NG*) for the engine speed as a function at least of the thrust command (TCL), of the drive speed setpoint (RTM*), and of a rotor collective pitch command ($\theta_0$).

10 Claims, 6 Drawing Sheets

ROTORCRAFT CONTROL SYSTEM

The present invention relates to a rotorcraft and to a system for controlling (i.e. regulating or piloting) engine members of the rotorcraft.

BACKGROUND OF THE INVENTION

The term rotorcraft is used to designate an aircraft in which all or some of its lift is provided by one or more propellers of substantially vertical axis and large diameter, referred to as rotors or a rotary wing.

There are several distinct types in category of rotorcraft.

Firstly there is the helicopter in which at least one main rotor driven by a suitable power plant provides both lift and propulsion. A helicopter is capable of hovering flight, remaining at a fixed point in three dimensions, and it can take off and land vertically, and it can move in any direction (forwards, rearwards, sideways, upwards, downwards).

Then there is the autogyro (first made by La Cierva) which is a rotorcraft in which the rotor does not receive power, but rotates in autorotation under the effect of the speed of the rotorcraft. Propulsion is provided by a turbine engine or by a propeller having an axis that is substantially horizontal in forward flight and that is driven by a conventional engine. That configuration is not capable of vertical flight unless the rotor is initially set into rotation by an auxiliary device enabling the rotor to be caused to rotate faster: an autogyro is therefore not capable of performing hovering flight but only of moving upwards or downwards on flightpaths having very steep slopes. It is, so to speak, an airplane with a wide range of flying speeds that is not liable to stalling, and that can use short runways.

A gyrodyne is a rotorcraft intermediate between the helicopter and the autogyro in which the rotor provides lift only. The rotor is normally driven by an engine installation during stages of takeoff, hovering or vertical flight, and landing, like a helicopter. A gyrodyne also has an additional propulsion system that is essentially different from the rotor assembly. In forward flight, the rotor continues to provide lift, but only in autorotation mode, i.e. without power being transmitted to said rotor. The Fairey Jet Gyrodyne is an embodiment of this concept.

Several other novel formulae have been studied to a greater or lesser extent, and some have given rise to practical embodiments.

In this respect, mention can be made of the compound rotorcraft that takes off and lands like a helicopter and that cruises like an autogyro: its rotor, driven in autorotation motion by the forward speed of the rotorcraft provides some of the lift, the remainder being provided by an auxiliary wing; a tractor propeller of substantially horizontal axis generates the force needed to move in translation. As example, mention can be made of the experimental Farfadet SO 1310 compound rotorcraft having its rotor propelled by reaction in the takeoff/landing configuration and rotating under autorotation in the cruising configuration, propulsion then being provided by a propeller. The vehicle is provided with two separate turbines for actuating the rotor and the propeller.

The convertible rotorcraft constitutes another particular rotorcraft formula. This term covers all rotorcraft that change of configuration in flight: takeoff and landing in a helicopter configuration; and cruising flight in an airplane configuration, e.g. with two rotors being tilted through about 90° to act as propellers. The tilting rotor concept has been implemented in the Bell Boeing V22 Osprey, for example.

Of those various forms of rotorcraft, the helicopter is the simplest, and as a result it has been successful in spite of having a maximum horizontal speed in translation of about 300 kilometers per hour (km/h) which is small and less than that which can be envisaged by compound rotorcraft and convertible type formulae that are technically more complex and more expensive.

Under such conditions, improvements to the above formulae have been proposed for increasing rotorcraft performance, but without that leading to solutions that are complicated, difficult to manufacture and to operate, and consequently expensive.

Thus, patent GB-895 590 discloses a vertical takeoff and landing aircraft comprising a fuselage and two half-wings (one on either side of the fuselage), a horizontal stabilizer and rudder control, four interconnected drive units, a main rotor, two reversible pitch propellers that are variable relative to each other, and means under pilot control for transmitting drive power continuously or from time to time to the rotor and to the propellers.

Under such circumstances, the main rotor is rotated by the power units during takeoff and landing, during vertical flight, and for horizontal flight at low speed. At high speed, the rotor turns freely without power being transmitted thereto, like an autogyro, the rotor shaft being fitted with decoupling means.

U.S. Pat. No. 3,385,537 discloses a helicopter comprising in conventional manner a fuselage, a main rotor, and a tail rotor. The main rotor is rotated by a first power unit. That vehicle is also fitted with two other engines, each engine being disposed at the outermost end of two half-wings disposed on either side of said fuselage. The patent relates to automatically varying the pitch of the blades as a function of the acceleration exerted on the vehicle while maneuvering or during gusts of wind, for example, so as to maintain a proper distribution of lift between the rotor and the half-wings. As a result, the corresponding device contributes to increasing the horizontal speed of the rotorcraft by reducing the risks of the blades stalling, constituting sources of variation and damage to the mechanical assemblies and structures.

U.S. Pat. No. 6,669,137 describes an aircraft fitted with a rotary wing for operating at very low speed. At high speeds, the rotary wing is slowed down and then stopped, with lift then being produced by a scissors wing. At maximum speeds, the rotary wing and the scissors wing are put into a determined configuration so as to form a kind of swept-back wing.

The rotorcraft according to U.S. Pat. No. 7,137,591 has a rotor rotated by a power unit, in particular for takeoff, landing, and vertical flight. A thrust propeller is used in cruising flight, with lift being generated by autorotation of the rotor, possibly with assistance from an auxiliary wing. Furthermore, the rotor mast can be tilted forwards and rearwards a little so as to eliminate the effects due to changes in the attitude of the fuselage that might harm the performance of the rotorcraft by increasing its aerodynamic drag.

U.S. Pat. No. 6,467,726 discloses a rotorcraft comprising a fuselage, two high wings, four propulsion propellers, two main rotors without cyclic pitch control, each connected to one of the two wings, two engines, and the associated means for transmitting power to the rotors and to the propellers, and a collective pitch control system for each propeller and for each rotor.

In cruising flight, lift is developed by the two wings, so that the lift due to the rotor is eliminated either by decoupling the rotor via a clutch provided for this purpose, or by appropriately setting the collective pitch of the rotor blades.

U.S. Pat. No. 6,513,752 relates to a rotorcraft comprising a fuselage and a wing, two variable-pitch propellers, a rotor with "end" masses, a power source driving the two propellers and the rotor, control means for adjusting the pitch of the propellers so that in forward flight the thrust from the propellers is exerted towards the front of the rotorcraft, and such that in hovering flight, the antitorque function is provided by one propeller providing thrust towards the front and the other propeller towards the rear of the rotorcraft, with the rotor being driven by the power source.

The power source comprises an engine and a clutch that, by disconnecting the rotor from the engine, enables the rotor to turn faster than an outlet from said engine, because of the above-mentioned masses.

That patent specifies that the clutch permits autogyro mode in forward flight. In addition, a power transmission gearbox disposed between the power source and the propellers enables said propellers to operate at a plurality of speeds of rotation relative to the speed of an outlet from said power source.

Patent application US-2006/0269414 A1 deals with the particular problem of improving the performance of a helicopter both during vertical flight and during cruising flight. A high speed of rotation for the rotor is then desired during vertical flight in order to increase lift, whereas in cruising flight, said speed of rotation can be reduced while increasing the forward speed of the helicopter.

That patent describes a main gearbox associated with a second power gearbox driven by the engine installation. The second gearbox includes a clutch device which, when engaged, entrains the main gearbox at a first speed of rotation, with disengagement communicating a second speed of rotation thereto that is lower than the first speed of rotation. Naturally, the main gearbox drives the rotor(s).

Nevertheless, from the above considerations, it can be seen that technical solutions that tend to improve the performance of a rotorcraft are based essentially on the following proposals:

operating the rotor at two distinct speeds of rotation relating firstly to vertical flight and secondly to cruising flight, by means of a drive system with variable speed ratios between the engine installation, the rotor, the propeller(s), and the various component elements of the drive system.

Operating the rotor in autogyro mode during cruising flight: the rotor rotates without driving power being delivered, and then provides some or all of the lift of the rotorcraft, but also leads to drag that nevertheless leads to a loss of power because of a low lift/drag ratio, while in contrast the rotor of a helicopter propels the rotorcraft in the direction desired by the pilot.

In particular, the operation of a rotor in autorotation like an autogyro during cruising flight makes it necessary in principle to disconnect the shaft for driving rotation of the rotor from the entire power transmission system.

Consequently, this separation is obtained by means such as a clutch having the sole function of preventing the rotor being rotated by the power source(s), and to do so only during the transition from vertical flight to cruising flight.

A device of that type therefore implies additional weight and cost, and constitutes a penalty in terms of safety.

Stopping the rotor and reconfiguring it, e.g. a three-blade rotor stopped in a particular configuration serves as a swept-back wing for flight at a high forward speed, or indeed, after stopping, it is possible to envisage folding the rotor over the fuselage during a rotorcraft-to-airplane transition stage.

It can be understood that those solutions complicate the technical implementation and contribute to increasing weight, and thus to increasing installed power and consequently expense, but without that achieving an optimized vehicle.

OBJECTS AND SUMMARY OF THE INVENTION

An object of the present invention is to propose a rotorcraft and a system for piloting it that enable the above-mentioned limitations to be overcome.

An object of the invention is to propose a rotorcraft capable of performing missions effectively during long periods of vertical flight and to perform cruising flights at high speed, and also to enable long distances to be traveled, e.g. being capable of transporting 16 passengers at 220 knots (kt) in a vehicle weighing about 8 metric tonnes (t) on takeoff over a distance of 400 nautical miles (nm) at an altitude of 1500 meters (m) under international standard atmosphere (ISA) conditions.

The engine power of a helicopter (not having a propeller thruster) is generally regulated by means including a control module/member that adapts the power delivered by the engine installation to the power required by the moving parts (rotors and accessories) in such a manner as to maintain the speeds of rotation of the main rotor and of the power transmission system at their setpoint values.

On an aircraft propelled by variable-pitch propellers, power regulation generally includes a regulation module/member (generally of the hydraulic and mechanical type) that adapts the pitch of the propulsive propeller so as to consume all of the available power that results from the pilot operating a fuel (or thrust) control member or lever.

Those two modes of regulation cannot be juxtaposed for regulating the power of a rotorcraft fitted with one or more thrusters, since those modes of regulation are in opposition: the member for adapting power during conventional regulation of a helicopter opposes (transient) variation in the speed of the power transmission system of the kind that would result from a command to vary thrust from the propeller(s).

Furthermore, for a rotorcraft fitted with one or more thrusters, regulating the propeller thruster(s) by the pilot directly controlling variations in the pitch of the propulsion propeller(s), could lead to a propeller being damaged as the result of sudden variations in the driving torque transmitted thereto.

An object of the invention is to propose a system for controlling a rotorcraft fitted with one or more thrusters, and also a rotorcraft including such a control system, that is improved and/or that remedies, at least in part, the shortcomings or drawbacks of known rotorcraft control systems.

An object of the invention is to propose such a control system for a rotorcraft fitted with a rotary wing and with one or more thrusters that is/are directly engaged mechanically with the drive engine(s), the engine(s) being common to the rotary wing and to the thrusters).

An object of the invention is to propose such a control system for a rotorcraft fitted with a rotary wing and one or more thrusters, and in which the speed of rotation of the rotary wing and of the thruster(s) is caused to decrease from (above) a determined travel speed of the rotorcraft.

In one aspect, the invention provides a system for controlling a rotorcraft comprising a rotor, at least one variable-pitch propulsion propeller, and a motor for driving the rotor and the propeller(s), that comprises:

a member for generating a propeller pitch setpoint ($\theta_p^* + \theta_d^*$, $\theta_p^* - \theta_d^*$) as a function in particular of a variation thrust command (TCL);

a member for generating a drive speed setpoint (RPM*) for the drive speed (RPM) of the rotor and the propellers), as a function in particular of the travel speed (VTAS) of the rotorcraft and where appropriate as a function of ambient temperature; and a member for generating an engine speed setpoint (NG*) for the engine speed as a function in particular of the thrust command (TCL), of the drive speed setpoint (RPM*), and of a rotor collective pitch command ($\theta_0$).

According to preferred characteristics of the invention:

the member for generating a setpoint (RPM*) for the drive speed (RPM) comprises:

a member for generating a reference drive speed (RPMref) as a function of the travel speed (VTAS) of the rotorcraft; and a limiter sensitive to the reference drive speed (RPMref) and delivering the drive speed setpoint (RPM*) for the drive speed;

the member for generating the engine speed setpoint (NG*) comprises:

a member for generating a first anticipated command for varying engine speed as a function of the rotor collective pitch command ($\theta_0$);

a member for generating a second anticipated command for varying engine speed as a function of the thrust command (TCL);

a first summing circuit for adding together the first and second anticipated commands for varying engine speed and for outputting a first component (NG1*) of the engine speed setpoint (NG*); and

* a unit for generating the engine speed setpoint (NG*) as a function of the first component (NG1*), of the drive speed setpoint (RPM*) r and of a measurement of the drive speed (RPM).

For a rotorcraft having (at least) two variable-pitch propulsion propellers that are disposed on either side of the fuselage of the rotorcraft, the system preferably comprises:

a member for generating a mean pitch setpoint ($\theta_p$*) for the mean pitch ($\theta_p$) of the two propellers as a function of the propulsion/thrust variation command (TCL);

a member for generating a pitch difference setpoint ($\theta_d$*) for half the difference in pitch ($\theta_d$) between the two propellers as a function of the rotor collective pitch variation command ($\theta_0$) and of a heading/yaw variation command (Pal);

a summing circuit for adding together the mean pitch setpoint ($\theta_p$*) and the pitch difference setpoint ($\theta_d$*), and for delivering the resulting setpoint ($\theta_p$*+$\theta_d$*) to a member for controlling the pitch of a first one of the two propellers; and a summing circuit used as a subtracter for subtracting the pitch difference setpoint ($\theta_d$*) From the mean pitch setpoint ($\theta_p$*) and for delivering the resulting setpoint ($\theta_p$*−$\theta_d$*) to a pitch control member of the second propeller.

The member for generating a pitch difference setpoint ($\theta_d$*) for half the pitch difference may comprise:

a decoupling unit for collective-yaw decoupling, which decoupling unit receives the rotor collective pitch variation command ($\theta_0$);

a processor unit for processing a heading variation command (Pal);

a summing circuit connected to the decoupling unit and to the processor unit; and a lowpass filter receiving as input the sum delivered by the summing circuit and delivering as output the pitch difference setpoint ($\theta_d$*) for half the pitch difference.

The member for generating a drive speed setpoint (RPM*) for the drive speed (RPM) may further comprise:

a member for generating a transient variation (RPMper) in the drive speed setpoint (RPM*) as a function of the propulsion/thrust variation command (TCL); and a summing circuit for adding the transient variation (RPMper) for the drive speed setpoint (RPM*) to the reference drive speed (RPMref) and for delivering said sum to the limiter that delivers the drive speed setpoint (RPM*).

The elements (members/modules) constituting the control system may be made, in whole or in part, in the form of electronic circuits.

Thus, in another aspect of the invention, there is proposed a program comprising a code recorded on a medium—such as a memory—or embodied by a signal, the code being readable and/or executable by at least one data processor unit such as a processor on board or suitable for being mounted on board a rotorcraft to control the operation of the engine(s) of the rotorcraft, the code comprising code segments for performing the respective operations that are characteristic of the invention.

In another aspect of the invention, there is provided a rotorcraft including such a control system.

In a preferred embodiment, in cruising flight, the longitudinal cyclic pitch of the rotor is controlled so as keep the fuselage attitude at a pitch angle (or longitudinal trim angle) that is equal to the slope of the flightpath so as to reduce to zero the angle of incidence of the fuselage relative to air, thereby minimizing drag from said fuselage. Consequently, and during level cruising flight, the longitudinal trim of the hybrid helicopter is maintained at a value of zero. Furthermore, and advantageously, the pitching moment of the fuselage is also adjusted by operating at least one movable pitch-control surface fitted to the horizontal stabilizer, e.g. by using an electric actuator, so as to compensate for any offset of the center of gravity of said hybrid helicopter: this adjustment is obtained in principle when the bending moment acting on the rotor mast relative to the pitch axis is zero, e.g. as measured by strain gauges.

It is advantageous to be able to adjust or even eliminate the pitching moment of the fuselage since firstly that acts directly on the bending moment in the rotor mast and thus on the fatigue stress thereof, and secondly it leads to overall balance of the vehicle as a result of the way power is distributed between the propellers and the rotor. This distribution has an influence on the overall power balance since the propellers and the rotor present different respective efficiencies.

During this operation, the distribution of power between the rotor and the propellers can vary significantly as a function of the angle of inclination of the rotor disk because of its contribution to variations in total drag and in the propulsion of the vehicle. By way of example, the power needed in high-speed cruising flight is due mainly to the parasitic drag of the vehicle. At 140 kt, parasitic power represents approximately 50% of the total power requirement and can reach 75% at 220 kt, i.e. three times the power needed for lift. Efficiency at high speed thus depends on minimizing parasitic drag, whence the advantage of controlling the longitudinal trim of said hybrid helicopter.

This control is made possible by the two degrees of freedom made available by the first means for moving at least one pitch-control surface and by the second means for controlling the cyclic pitch of the rotor blades.

These first and second control means are independent of each other.

In practice, the pitch-control surface can be adjusted manually in a simplified version. It is then necessary to provide the instrument panel with an indicator of the bending moment exerted on the rotor mast so as to enable the pilot to keep it within a determined range by acting manually on said movable pitch-control surface or indeed on the electric actuator.

When the pitch-control surface is operated automatically in an improved version, said first means comprise a computer acting via an electric actuator, for example, to cause said at least one pitch-control surface to turn through an angle that causes the tilting moment of the hybrid helicopter to match a first predetermined value, preferably equal to zero.

To do this, said computer determines the bending moment exerted on the rotor mast relative to the pitch axis as deduced from information delivered by sensors, said computer ceasing to move said pitch-control surface when the bending moment exerted on the rotor mast lies within a predetermined range corresponding substantially to the first reference value, preferably equal to zero, for the bending moment of said hybrid helicopter.

In other words, the term "first setpoint value for the pitching moment" can designate equally well a specific value or a narrow range of values for said pitching moment, in particular because of the dependency of the bending moment exerted on the rotor mast relative to the pitching moment of the hybrid helicopter.

In addition, since the pitching moment is controlled and preferably reduced to zero, it is also appropriate to control the angle of incidence of the hybrid helicopter and in particular to reduce it to zero so as to minimize parasitic drag. The second means thus adapt said angle of incidence to a second predetermined value, preferably equal to zero. These second means comprise at least a cyclic pitch stick that controls the cyclic pitch, in particular the longitudinal cyclic pitch of the rotor blades via a swashplate and pitch levers.

Naturally, it should be recalled that the lateral cyclic pitch is also involved to enable the vehicle to perform yaw maneuvers, with variations in the collective pitch of the rotor blades serving only to vary the lift of each blade by the same amount.

In one embodiment, it is proposed that, above approximately 125 kt, the speed of rotation of the rotor should be reduced progressively from a first speed of rotation $\Omega 1$ to a second speed $\Omega 2$ so as to limit the airspeed at the tip of the advancing blade, e.g. to 171 meters per second (m/s) for a flightpath airspeed of 220 kt, so as to maintain the Mach number at the advancing blade tip at about 0.85.

Naturally, this reduction in the speed of the rotation of the rotor is accompanied by a reduction in the lift provided by said rotor. Consequently, the wing compensates for this reduction in lift so as to contribute to 31% of the lift at 220 kt, as specified below in a particular application example.

It should also be observed that the wing generates lift regardless of the speed of advance of the rotorcraft except when in stationary flight where it presents a particular "negative lift" effect associated with interaction between the rotor and said wing.

Consequently, the lift provided by the rotor in cruising flight is controlled by a suitable device for controlling the collective pitch and by complying with the setpoint values for the speed of rotation of the rotor.

In the application example described below, the speed of rotation $\Omega$ of the rotor is equal to a first speed of rotation $\Omega 1$ of about 260 revolutions per minute (rpm) up to a first forward speed more correctly referred to as a first flightpath airspeed V1, of about 125 kt. Above that speed and up to a second flightpath airspeed of about 220 kt, the speed of rotation of the rotor is reduced progressively to a second speed of rotation $\Omega 2$ of about 205 rpm.

Furthermore, in normal conditions of operation of the integrated transmission system, the speeds of rotation at the outlet from the turbine engine(s), of the propeller(s), of the rotor, and of the mechanical system interconnecting them are mutually proportional, with the proportionality ratio being constant whatever the flight configuration of the hybrid helicopter.

It can thus be understood that if the hybrid helicopter has only one turbine engine, it rotates the rotor and the propeller(s) via the mechanical interconnection system. If the hybrid helicopter is fitted with two or more turbine engines, the rotor and the propeller(s) are then driven in rotation via the mechanical interconnection system by said turbine engines.

In other words, the power transmission system operates without any variable rotation ratio between the turbine engine(s), the propeller(s), the rotor, and the mechanical interconnection system.

Consequently, and advantageously, the rotor is always driven in rotation by the turbine engine, and always develops lift whatever the configuration of the vehicle.

Therefore, during flight phases in normal configuration, i.e. excluding the autorotation flight configuration either in a training objective to engine failure or following a real engine failure, the said at least one turboshaft engine is still in mechanical bond with the rotor. Therefore this rotor is still driven in rotation by the said at least one turboshaft engine irrespective of the flight phase in normal configuration, the flight phase in autorotation not being part of the flight phases in normal configuration.

Moreover, the rotor is thus designed to provide all of the lift of the hybrid helicopter during takeoff, landing, and vertical flight stages, and then to provide part of the lift during cruising flight, with the wing then contributing in part to supporting said hybrid helicopter.

Thus, the rotor delivers part of the lift to the hybrid helicopter in cruising flight, possibly also with a small contribution to propulsion or traction forces (acting as a helicopter) or without any contribution to drag (acting as an autogyro). These conditions of operation thus lead to less power being delivered for the purpose of enabling the rotor to provide traction. It should be observed that a small contribution to propulsion forces is made by the rotor disk being tilted towards the front of the vehicle by a small amount only. This process degrades the lift/drag ratio of the rotor very little so it is consequently more advantageous in terms of power balance than an additional demand for thrust delivered by the propeller(s).

Advantageously, the wing is made up of two half-wings, located on either side of the fuselage. These half-wings can constitute a high wing, in which case they preferably present a negative dihedral angle. Nevertheless, they could also constitute either a low wing, preferably having a positive dihedral angle, or indeed an intermediate wing of any dihedral angle. The shape of these half-wings in plan view may correspond, depending on the variant, to half-wings that are rectangular, tapered, forward-swept, swept-back, . . . .

Favorably, the span of the total wing lies in the range 7 m to 9 m for a vehicle having a maximum authorized takeoff weight of about 8 tonnes.

In a preferred version, the total span of the wing is substantially equal to the radius of the rotor, i.e. substantially equal to 8 m, the chord of the wing being set at 1.50 m, i.e. giving an aspect ratio of about 5.30.

In a variant of the invention, the wing is fitted with ailerons.

Preferably, the helicopter is fitted with two propulsive propellers located on either side of the fuselage, advantageously at the ends of the two half-wings.

To provide the required performance for the vehicle, each propeller has a diameter lying in the range 2.5 m to 4.5 m, with the diameter of the propellers being 2.6 m in a particular version that has been studied, as explained below.

Naturally, since the rotor is always driven mechanically by the turbine engine(s), the rotor produces an "opposing rotor torque" tending to make the fuselage turn in the opposite direction to the rotor. In general, manufacturers install an antitorque rotor at the rear of the fuselage in order to compensate for the rotor torque. This antitorque rotor in a conventional helicopter is situated behind the fuselage at a distance of about 1.5 times the radius of the main rotor, so as to avoid any mechanical Interference between them. Such a rotor generally requires about 12% of the power of the main rotor in vertical flight. In addition, the thrust from said rotor is also used for steering the helicopter.

The propellers can be located substantially in alignment relative to the chord plane of the wings or half-wings, or they can be offset either above or below the wings or half-wings to which they are connected by a supporting mast.

As mentioned above, the wing span is advantageously of the same order of magnitude as the radius of the rotor, i.e. as small as possible because of the high lift/drag ratio of the rotor in cruising flight, as explained below. As a result the distance between the two propellers is also of the same order of magnitude as the radius of the rotor. Under such conditions, the thrust from the propellers is necessarily greater than that from an antitorque rotor.

In addition and on the basis of the geometrical data given above by way of example, the diameter of the propellers must be reduced from 3.0 m for a conventional helicopter to about 2.6 m for the hybrid helicopter so as to allow sufficient space between said rotor and said propellers, thereby further increasing the power needed for the antitorque function, in spite of the favorable effect of the dihedral angle of the wing.

In any event, this penalty in terms of power is easily compensated by the large power margin in vertical flight (see below) and by the savings in weight and cost that result from omitting the antitorque rotor and the associated power transmission system as represented by horizontal and sloping power transmission shafts and gearboxes known as the "intermediate" and the "rear" gearboxes.

It can readily be understood that because of the constant proportionality ratio between the speeds of rotation of the various components of the integrated transmission system, the turbine engine(s), the propellers), the rotor, and the mechanical interconnection system all operate at respective first and second speeds of rotation that are themselves at constant ratios, i.e. the ratios between the second speeds of rotation are the same as the ratios between the first speeds of rotation. In other words, first and second speeds of rotation are defined respectively relative to first and second flightpath airspeeds, and they apply to the turbine engine(s), to the propeller(s), and to the mechanical interconnection system. It can be observed that these second speeds of rotation correspond to 78% of the first speeds of rotation (nominal speeds: 100% of the first speeds of rotation) in the application already described.

Naturally, the speeds of rotation of the turbine engine(s), of the propeller(s)), and of the mechanical interconnection system are reduced progressively between their first and second respective speeds of rotation, to comply with variation in the speed of rotation of the rotor between its first and second speeds of rotation in application of a relationship that is linear or substantially linear.

These various functions described above are made possible by a mechanical interconnection system suitable for transmitting power. Such a system must be capable of transmitting high levels of torque, in particular because of the high level of power absorbed and the relatively low speed of rotation of the rotor. This requires large reduction ratios in speed of rotation between the various components of the drive system, while maintaining a weight that is as small as possible and ensuring good endurance and good overall safety.

This architecture remains valid for turbine engines whether mounted on the fuselage or on the half-wings. If mounted on the half-wings, each speed reduction module is incorporated in the second gearboxes for the corresponding propeller instead of being disposed on either side of the first main gearbox.

The two associated modules comprise one or two reduction stages depending on the outlet speeds of rotation of the turbine engine. In general, a single stage suffices for a turbine engine outlet speed of 6,000 rpm, whereas two stages are necessary for an outlet speed of 21,000 rpm.

Furthermore, the two second gearboxes are fitted with respective speed reduction stages, since the first speed of rotation of the propellers (nominal speed of rotation) is about 2,000 rpm.

BRIEF DESCRIPTION OF THE DRAWINGS

Other aspects, characteristics, and advantages of the invention appear in the following description of examples given by way of illustration and with reference to the accompanying figures, in which.

MORE DETAILED DESCRIPTION

In the meaning of the present application, the term "hybrid helicopter" means a rotorcraft fitted with one or more thrusters, with regulation adapted both to the operation of the rotor and to the operation of the propellers.

Unless specified to the contrary, implicitly or explicitly, the term "rotor" designates a rotary wing of the rotorcraft.

Unless specified to the contrary, implicitly or explicitly, any element present in two or more distinct figures is given the same reference in each of them.

Figure 1:
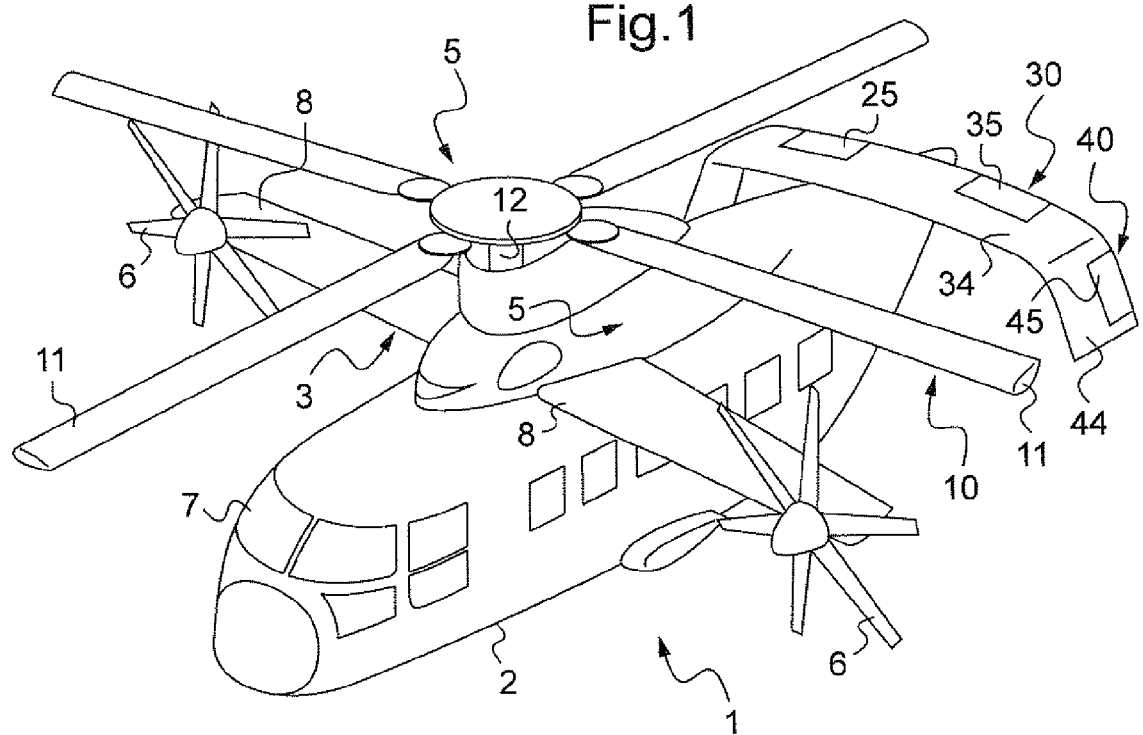
FIG. 1 is a diagrammatic perspective view of an embodiment of a hybrid helicopter of the invention.

With reference to FIG. 1 in particular, the hybrid helicopter 1 comprises a fuselage 2 with a cockpit 7 at the front thereof, a rotor 10 for driving blades 11 in rotation by means firstly of two turbine engines 5 disposed on top of the fuselage 2 (not visible in FIG. 1 because of the presence of fairing), on either side of the longitudinal plane of symmetry of the rotorcraft, and secondly a main first gearbox MGB (not shown in FIG. 1).

Furthermore, the hybrid helicopter 1 is provided with a high wing 3 made up of two half-wings 8 disposed on top of the fuselage 2, these half-wings 8 being substantially rectangular in plane view and presenting a negative dihedral angle.

The hybrid helicopter 1 is propelled by two propellers 6 driven by the two turbine engines 5, one propeller 6 being disposed at each of the outer ends of the wing 3.

Furthermore, in the vicinity of the rear end of the fuselage 2, surfaces are provided for stabilizing and maneuvering purposes, i.e. for pitch control a horizontal stabilizer 30 having two pitch-control surfaces 35 that are movable relative to the front portion 34, and for steering two appropriate stabilizers 40, each located at a respective end of the horizontal stabilizer 30.

Advantageously, the stabilizers 40, which are vertical or inclined relative to the vertical, can be constituted by respective non-moving front portions (or fins) 44 and moving rear portions or rudders 45 for yaw control.

Specifically, the horizontal stabilizer 30 and the vertical stabilizers 40 form a U-shape that is turned upside-down towards the fuselage 2.

From a dimensional point of view, the hybrid helicopter 1 presently corresponds to the following characteristics, relating to a rotorcraft of about 8 tonnes maximum weight authorized for takeoff:
  rotor diameter D: about 16 m;
  propeller diameter d: 2.6 m;
  wing span L: 8 m; and
  aspect ratio $\lambda$ of the wing: 5.3.

Figure 2:
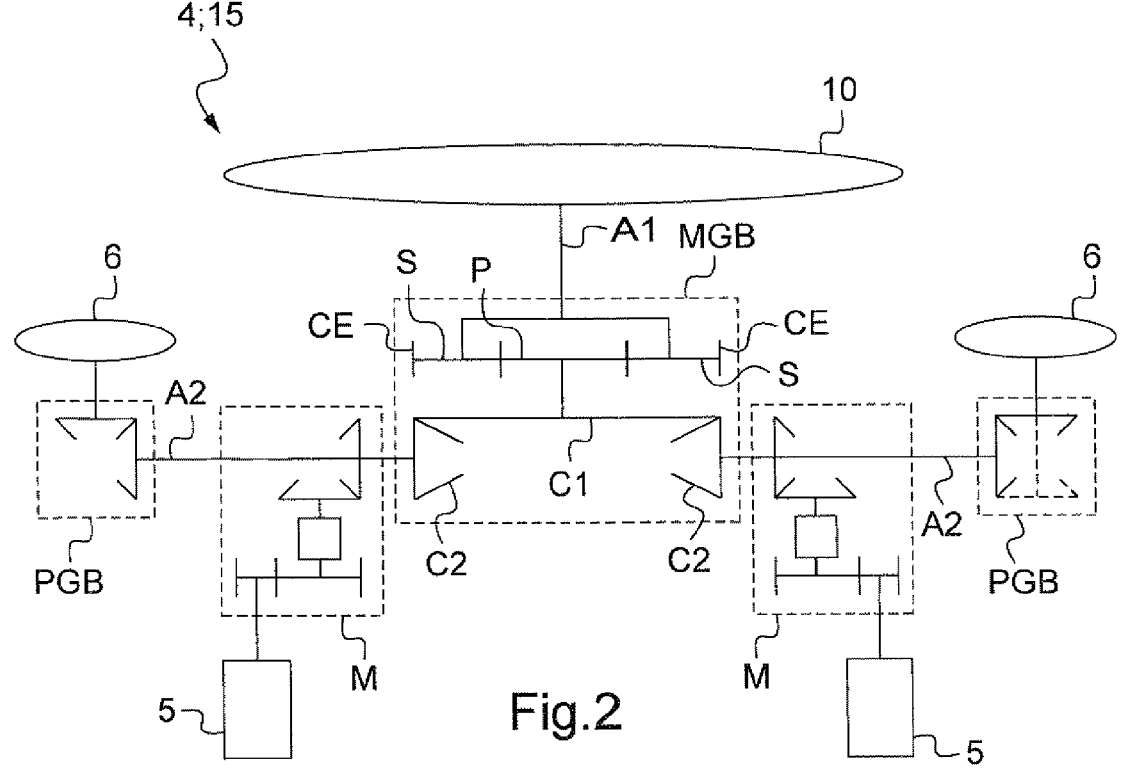
FIG. 2 is a diagrammatic view of the drive system.

In addition, the hybrid helicopter 1 is fitted with an integrated drive system 4 that comprises not only the two turbine engines 5, the rotor 10, and the two propellers 6, but also a mechanical interconnection system 15 between these elements as shown diagrammatically in FIG. 2, which is a simplified representation in which it should be understood that the rotor 10 and the propellers 6 rotate in planes that are orthogonal and not parallel.

With this configuration, the hybrid helicopter 1 is remarkable in that the speeds of rotation of the turbine engine outlets, of the propellers, of the rotor, and of the mechanical interconnection system are mutually proportional, with the proportionality ratio being constant under normal conditions of operation of the integrated drive system, regardless of the flight configuration of the hybrid helicopter.

Naturally, special devices lying outside the ambit to the invention are activated in the event of possible mechanical breakdowns.

With reference to FIG. 2, the mechanical interconnection system comprises the following main components:
  a main first gearbox MGB situated in the fuselage 2 and driving the rotor 10 at 263 rpm at the nominal speed of rotation (or the first speed of rotation of the rotor);
  two second gearboxes PGB, each of the gearboxes PGB driving one of the propellers 6 at 2,000 rpm at the nominal speed of rotation.;
  a first shaft A1 rotated by the main first gearbox MGB for driving the rotor 10;
  two second shafts A2, each disposed in a respective one of the half-wings 8, substantially at one-fourth of the chord, and delivering power to the rotor and to the propellers 6, the speeds of rotation of the shafts also being 3,000 rpm at the nominal speed of rotation or first speed of rotation of the second shafts;
  the two second shafts A2 are driven in rotation by the two turbine engines 5 via two associated modules M that, depending on the type of turbine engine, reduce the speeds of the turbine engines 5 from 21,000 rpm or from 6,000 rpm to 3,000 rpm for the first speed of rotation of said shafts.

The main first gearbox MSB has two stages, namely:
  a spiral bevel toothed ring C1 driven by two bevel gears C2, each connected to one of said second shafts A2; and
  said ring C1 operating at the first speed of rotation of the installation to drive the sunwheel P of an epicyclic stage at 1,000 rpm so as to put the rotor into rotation via planet gears S rotating on a stationary outer ring CE.

In addition, the hybrid helicopter 1 is such that the collective pitch and the cyclic pitch of the blades 11 of the rotor 10 are controlled and adapted as a function of flight conditions; the pitches are adapted to variation in the speed of rotation of the rotor as a function of the flightpath airspeed (VTAS) of the rotorcraft.

For the propellers 6, only the collective pitch is controlled and adapted as a function of flight conditions; it is controlled automatically to provide the necessary thrust compatible with the operation of the rotor.

Furthermore, the hybrid helicopter 1 is adjusted to high-speed cruising flight so that the rotor 10 exerts lift possibly with a small contribution to the propulsion forces but without any contribution to drag. Naturally, this requires power to be absorbed by said rotor 10 to balance the torque generated by the profile drag and the induced drag of the blades 11 of the rotor 10, but this power is relatively small, i.e. about 500 kilowatts (kW) as mentioned above, because of the lift/drag ratio of the rotor which is about 12.2 above 150 kt.

The small contribution to propulsion forces occurs because of the rotor disk being tilted a little towards the front of the rotorcraft, which solution can be more favorable in terms of power balance than additional thrust from the propellers because the lift/drag ratio of the rotor is relatively insensitive to small variations in the trim of the hybrid helicopter.

Furthermore, it is advantageous to be able to adjust or even eliminate the pitching moment of the fuselage since firstly it acts directly on the bending moment in the rotor mast and thus on the fatigue stressing thereof, and secondly gives rise to the overall balance of the rotorcraft as a result of the way power is distributed between the propellers and the rotor. This distribution has an influence on the overall power balance since the propellers and the rotor have different respective efficiencies.

Figure 3:
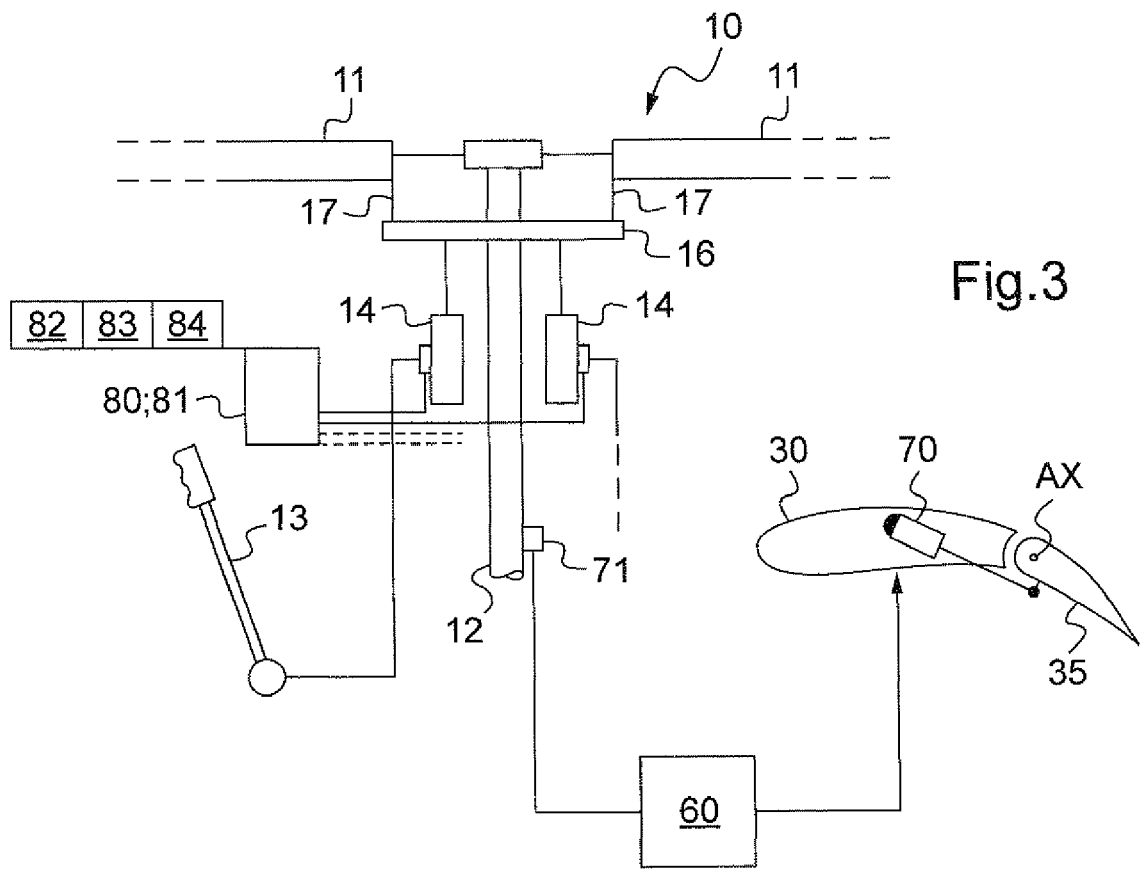
FIG. 3 is a diagram of the device for adjusting the longitudinal trim of the hybrid helicopter.

As a result, and as shown in FIG. 3, the preferably automatic maneuvering of at least one movable pitch-control surface 35 fitted to the horizontal stabilizer 30 under drive from an electric actuator 70 makes it possible to adjust or even eliminate any pitching moment that results from the center of gravity becoming offset relative to the lift line of action of said hybrid helicopter: this adjustment is obtained when the bending moment exerted on the rotor mast 12 relative to the pitch axis and as measured by strain gauges 71, for example, reduces to zero.

In addition, and independently, the longitudinal cyclic pitch of the rotor 10 is controlled and adapted as a function of flight conditions in order to maintain the attitude of the fuselage at a longitudinal trim angle or pitch angle that is equal to the slope of the flightpath, so as to reduce the angle of incidence of the fuselage relative to the air to zero, thereby minimizing the drag of said fuselage. Consequently, during a level cruising flight, the longitudinal trim of the hybrid helicopter is maintained at a value of zero.

In practice, the pitch-control surface 35 can be controlled manually in a simplified version. It is then necessary to provide an indicator on the instrument panel to indicate the bending moment being exerted on the rotor mast 12, which bending moment the pilot must then keep within a determined range by acting manually on said movable pitch-control surface 35 or indeed on the electric actuator 70.

When the pitch-control surface 35 is maneuvered automatically in an improved version, the electric actuator 70 is controlled by a computer 60 that determines the bending moment exerted on the rotor mast 12, as deduced from information delivered by sensors 71, preferably strain gauges disposed on said rotor mast 12. In this way, the computer 60 ceases to move said at least one pitch-control surface 35 about its axis AX when the bending moment exerted on the rotor mast relative to the pitch axis lies within a predetermined range corresponding substantially to the first setpoint value, (preferably equal to zero) for the pitching moment of said hybrid helicopter 1.

As a result, the computer 60, the electric actuator 70, and the sensors 71 constitute first means for automatically controlling the angle at which said at least one pitch-control surface 35 is set as a function of the bending moment exerted on the rotor mast 12 relative to the pitch axis of the hybrid helicopter 1. Naturally, it is possible to use a plurality of control surfaces 35 for this operation.

Independently, second means 13, 14, 16, 17 control the cyclic pitch of the blades 11 of the rotor 10 so as to control the longitudinal trim of the hybrid helicopter 1 as a function of flight conditions, adapting it to a second predetermined value relating to said longitudinal trim.

Advantageously, said second predetermined value corresponds to a longitudinal trim angle equal to the slope of the flightpath of the rotorcraft, as mentioned above.

Consequently, this second longitudinal trim value is equal to zero during level flight of the hybrid helicopter 1.

Said second means comprise a cyclic pitch stick 13 that controls servo-controls 14 for imparting the cyclic pitch to the blades 11 of the rotor 10 via a swashplate 16 and pitch levers 17.

In practice, it turns out the pilot can use an artificial horizon for ensuring a zero longitudinal trim in level flight by using the second means 13, 14, 16, 17.

In contrast, an appropriate system needs to be implemented when an arbitrary slope is required on the flightpath.

For this purpose, said second means are associated with an automatic servo-control device 80 for automatically servo-controlling the longitudinal trim of the hybrid helicopter 1, this automatic servo-control device 80 being integrated in an autopilot 81 and specifically comprising a global positioning system (GPS) 82 for determining said flightpath slope, and an attitude and heading reference system (AHRS) 83 for defining the trim of the hybrid helicopter 1 in such a manner as to deduce therefrom the angle of incidence of the fuselage of said hybrid helicopter 1 relative to the air and to make it zero, together with an anemometer installation 84 for correcting errors associated with wind.

This adjustment operation consists in properly positioning the fuselage 2 and the rotor 10 at an angle of incidence that is substantially zero relative to the flow of air, so as to achieve minimum overall drag and maximum lift/drag ratio. Compared with operating in autogyro mode, the balance is favorable, since with an autogyro, the rotor is the seat of considerable drag, whereas in the present invention, rotor drag is minimized.

From the point of view of flight mechanics, it is recalled that the rotor 10 serves to provide all of the lift of the hybrid helicopter 1 during stages of takeoff, landing, and vertical flight, and some of the lift during cruising flight, with the wing 3 then contributing to provide part of the lift for supporting said hybrid helicopter 1.

Naturally, since the rotor 10 is always driven mechanically by the turbine engine 5, this rotor 10 produces "resistive rotor torque" that tends to cause the fuselage 2 to turn in the opposite direction to the rotor 10.

The hybrid helicopter 1 of the invention does not have an antitorque rotor in order to simplify its mechanical assemblies, and consequently reduce the weight and the cost of the rotorcraft.

Consequently, since the hybrid helicopter 1 has two propellers 6, each installed on a half-wing 8 on either side of the fuselage 2, the steering control and antitorque functions are provided by making use of differential thrust, is the difference between the thrusts exerted by the propellers.

In other words, in vertical flight, propeller 6 on the left fuselage exerts thrust towards the rear of the rotorcraft ("rear thrust") while the propeller 6 on the right produces thrust towards the front ("front thrust") assuming that the rotor 10 rotates anticlockwise when seen from above.

In a variant, the antitorque function may also be performed in such a manner that, on the above example, the right propeller 6 develops double thrust while the left propeller 6 does not provide any thrust, it being understood that the rotor 10 must then be inclined towards the rear of the rotorcraft in order to balance the thrust from the right propeller. Under such circumstances, it can be shown that more power is required than when the two propellers provide thrust in opposite directions.

Naturally, likewise in a variant, it will be understood that an intermediate solution could correspond to an antitorque function being performed by a blend of the above two concepts (pure differential thrust or pure double thrust).

Figure 4:
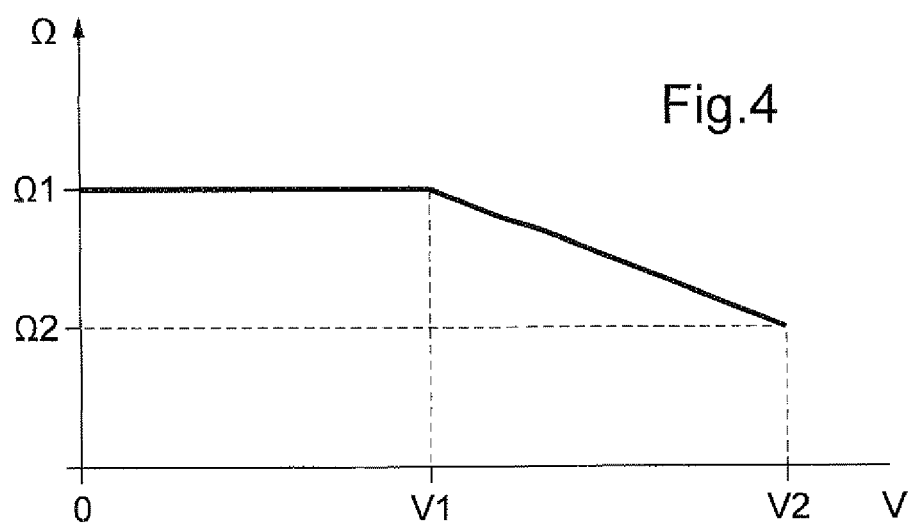
FIG. 4 is a diagram showing the relationship for variation in the speed of rotation of the rotor as a function of the forward speed of the hybrid helicopter.

Consequently, and on the basis of the above-described example and of FIG. 4, the speed of rotation of the rotor 10 is equal to a first speed of rotation $\Omega 1$ of about 263 rpm up to a first forward speed V1, more correctly referred to as a first flightpath airspeed, of 125 kt. At higher speeds and up to a second flightpath airspeed V2 of 220 kt, the speed of rotation of the rotor is reduced progressively to a second speed of rotation $\Omega 2$ of 205 rpm. The progressive reduction in the speed of rotation of the rotor 10 between the first and second flightpath speeds varies in application of a linear relationship of slope $(-1/R)$ where R is the radius of the rotor, and in a coordinate system where speed V is plotted along the abscissa and speed of rotation $\Omega$ of the rotor 10 is plotted up the ordinate.

It is known that if airspeed increases, the Mach number at the end of the advancing blade of a rotorcraft rotor reaches the Mach number known as the "drag-divergence" Mach number. Then, and at a maximum Mach number that is less than or equal to the drag divergence Mach number, the speed of rotation of the rotor needs to reduced progressively as a function of the increase in the forward speed of the rotorcraft so as to avoid exceeding that limit.

If the speed of sound is written c, the Mach number at the end of the advancing blade is equal to the expression (V+U)/c or indeed (V+ΩR)/c. Imposing a maximum Mach number equal to Mm amounts to causing Ω to vary in application of the following linear relationship [(c.Mm−V)/R].

Assuming that the maximum Mach number is equal to 0.85 for an airspeed at the blade tip of 220 m/s in vertical flight (speed of rotation of the rotor 263 rpm), the Mach number of the blades 11 in the advancing position reaches approximately 0.85 at a flightpath airspeed of 125 kt at an altitude of 1500 meters under ISA conditions (outside temperature: 5° C.).

Over the range 125 kt to 220 kt, the speed of rotation Ω is adapted to comply with the above-specified relationship.

When the flightpath airspeed of the rotorcraft is 220 kt, the airspeed at the tip of the blade due to rotation is equal to 171 m/s (speed of rotation of the rotor: 205 rpm or 78% of the nominal speed of the rotation of the rotor) and the advance parameter μ is equal to 0.66. At this value for the advance parameter, the lift of the rotor cannot be maintained without a large increase in the chord of the blades (60% increase which would lead to a conventional four-blade helicopter having a chord of one meter), in order to maintain a mean blade lift coefficient Czm of less than 0.5 and thus avoid separation at the retreating blade. It is clear that such overdimensioning of the blades at a high forward speed would lead to a significant increase in the weight of the rotorcraft and to penalizing its performance. Consequently, the rotor of the hybrid helicopter 1, having a maximum authorized takeoff weight of about 8 tonnes, is progressively taken over by a wing 3 of small span L that delivers lift of about 31% at 220 kt. Under such conditions, when the flightpath airspeed increases, the lift coefficient Czm of the blades, which in vertical flight is equal to 0.5 (wing lift contribution estimated at 4.5%), decreases to reach 0.43 at 125 kt because of the increase in lift from the wing 3, and it increases to reach a value of 0.54 at 220 kt because of the reduction in the speed of rotation of the rotor to 78% of its nominal speed of rotation. Under such conditions, the rotor operates with a maximum lift/drag ratio of about 12.2.

Unless specified to the contrary, implicitly or explicitly, the interconnections between the functional blocks/modules shown in FIGS. 5 to 12 in the form of rectangles are represented by means of arrows indicating the direction of travel of the corresponding signals/data.

Figure 5:
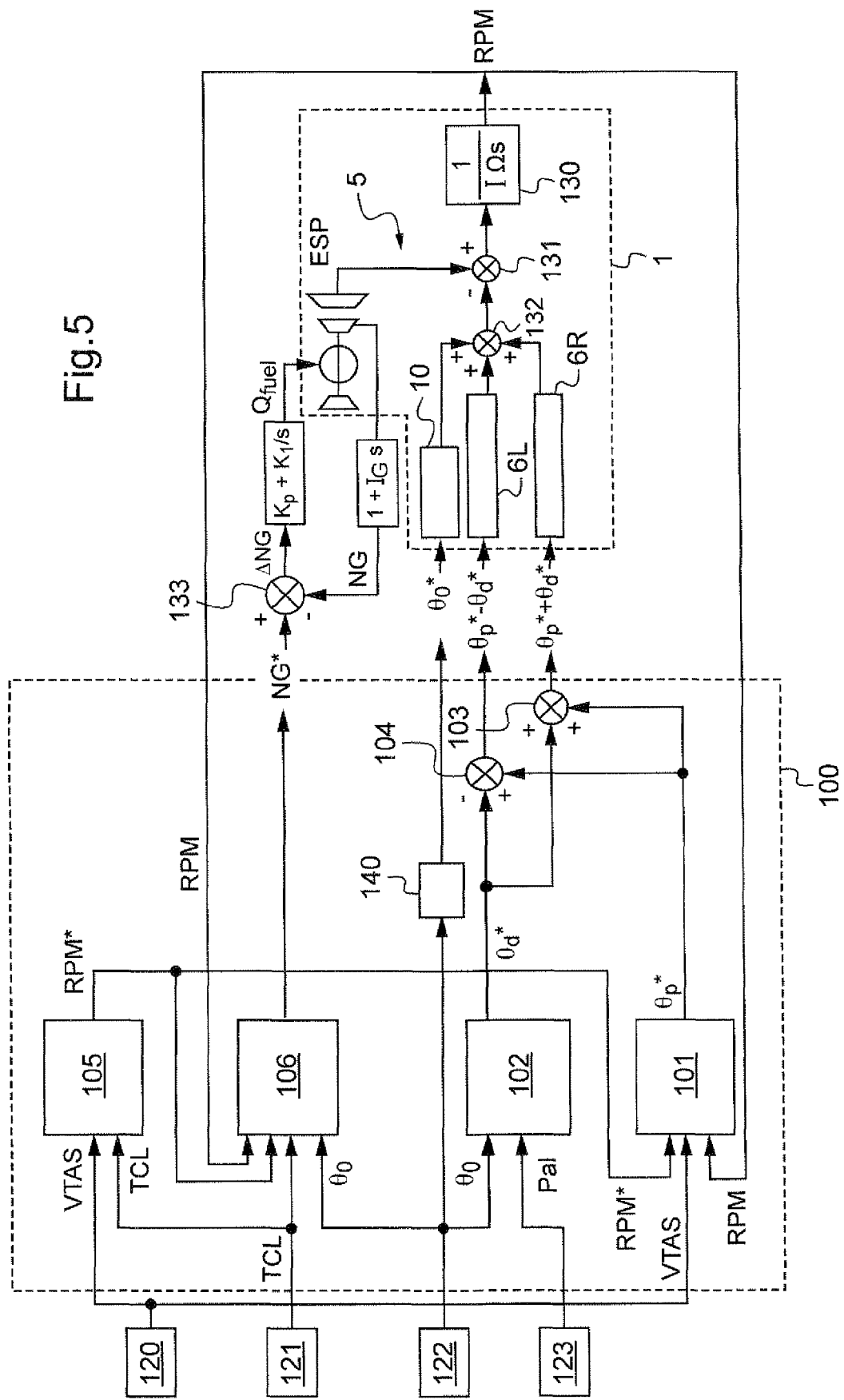
FIG. 5 is a flow chart showing the main components of a control system for the rotorcraft in a first embodiment.
Figure 6:
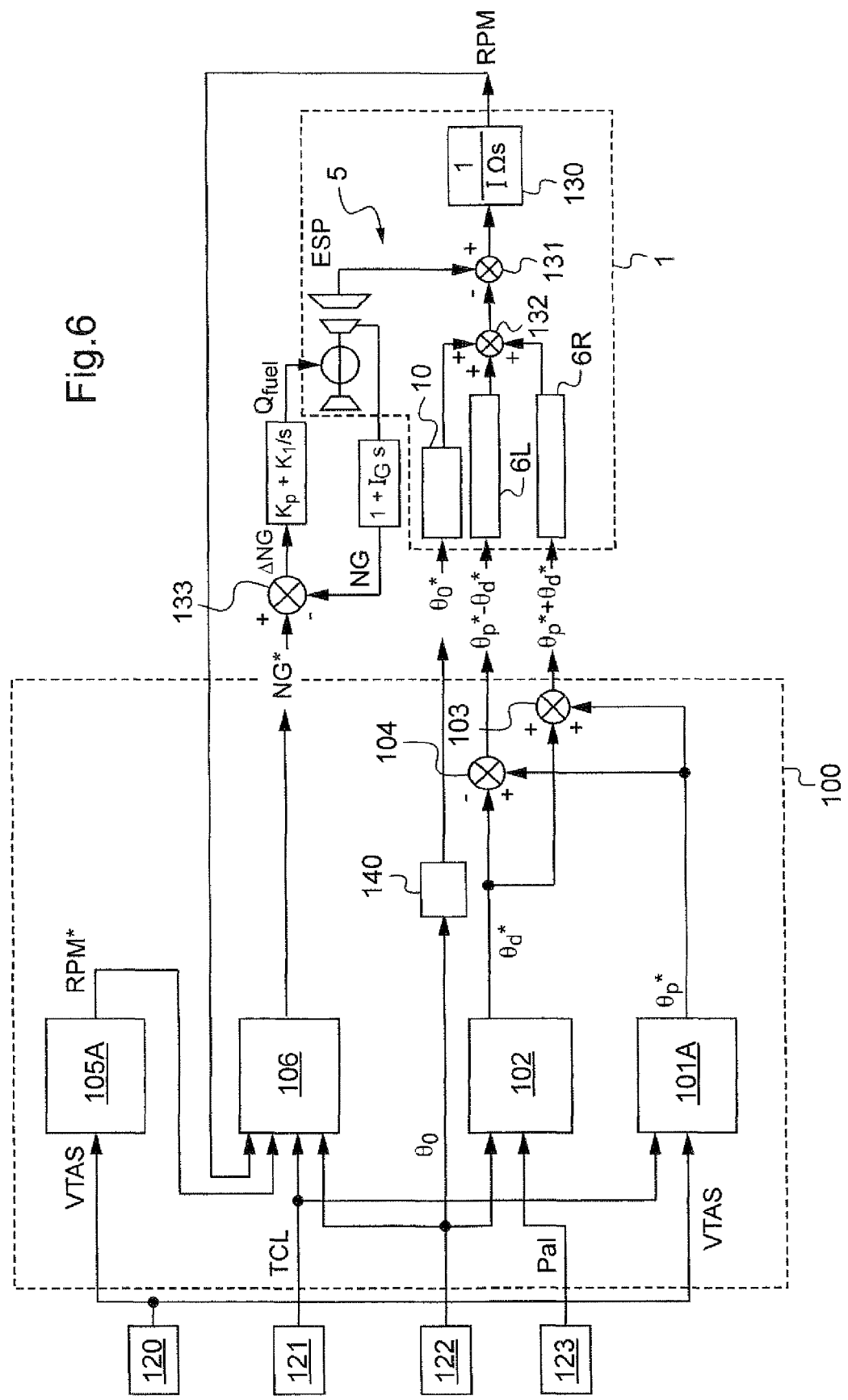
FIG. 6 is a flow chart showing the main components of a control system for the rotorcraft in a second embodiment.

With reference to FIGS. 5 and 6, the rotorcraft 1 is represented by a model in which the speed of rotation RPM of the elements of the driving power transmission system connecting the engine 5 to the rotor 10 and to the two thrusters 6L (left thruster) and 6R (right thruster) is the resultant coming from a block 130 having a transfer function equal to 1/(I*Ω*s), where I represents the overall inertia of the driven mechanical assembly, and Ω is equal to RPM.

Variation in this speed RPM is a function of the difference between the power ESP delivered at the output by the engine 5 and the power absorbed by the rotor and by the thrusters: an adder 131 takes this difference and applies it to the inlet of the block 130; another adder 132 accumulates the powers absorbed respectively firstly by the rotor and secondly by each of the thrusters.

The power ESP delivered by the engine is the result of variations in the fuel flow rate Qfuel that is delivered thereto; this flow rate is determined as a function of the difference ΔNG delivered at the outlet of a comparator 133 which subtracts the speed NG of the gas generator of the turbine engine 5 from the engine speed setpoint NG* for the gas generator.

Thus, the power of the turbine engine 5 is controlled/regulated by means of the engine speed setpoint NG* for the gas generator, as is the usual practice for a helicopter.

The collective pitch of the rotor 10 is varied by means of a collective pitch setpoint $\theta_0^*$ that is applied to a servo-control mechanism (not shown) designed to modify the pitch of the rotor blades.

In similar manner, the collective pitch of the propellers 6R, 6L is varied by means of a collective pitch setpoint ($\theta_p^* + \theta_d^*$, and $\theta_p^* - \theta_d^*$) for the propeller that is applied to a servo-control mechanism (not shown) respectively provided for modifying the pitch of the corresponding propeller.

The rotorcraft pilot then has several piloting control members available; each member may for example be presented in the form of a lever, a button, or a knob, which may be "real" or simulated (e.g. on a screen). For the flight control members having outputs that are taken into account by the invention for controlling the operation of the engine 5, the pilot can act on a member 121 (e.g. a pushbutton fitted to the collective pitch lever for the rotor) delivering a thrust variation command TCL, on a member 122 (e.g. a collective pitch lever for the rotor) delivering a collective pitch variation command $\theta_0$, and on a member 123 (e.g. a rudder bar) delivering a heading variation command Pal (or yaw command).

A sensor/calculator 120 also provides a measurement (or an estimate) of the flightpath airspeed VTAS of the rotorcraft.

The VTAS speed measurement, the commands, and the setpoints are presented in the form of signals or data.

The sensor 120 and the control members 121-123 are connected to an on-board system 100 for calculating/determinating engine speed setpoints NG* for the gas generator speed, $\theta_0^*$ for the rotor collective pitch, and ($\theta_p^* + \theta_d^*$) and ($\theta_p^* - \theta_d^*$) for the propeller collective pitches, which are delivered respectively to the corresponding servo-control.

The system 100 has a plurality of modules for processing the signals/data received from the members 120-123 (cf. FIGS. 5 and 6):

a module/member 101, 101A, 102, 103, 104 generates the propeller pitch setpoints ($\theta_p^* + \theta_d^*$, $\theta_p^* - \theta_d^*$) as a function in particular of a thrust variation command (TCL);

a module/member 105, 105A generates a drive speed setpoint RPM* for the drive speed RPM of the rotor and the propeller (or propellers) as a function in particular of the travel speed VTAS of the rotorcraft; and a module/member 106 generates an engine speed setpoint NG* for the engine speed as a function in particular of the thrust command TCL, the drive speed setpoint RPM*, and a rotor collective pitch command $\theta_o$.

In each of the two embodiments corresponding to FIGS. 5 and 6, the speed VTAS is input to the modules 101 (or 101) and 105 (or 105A). The thrust command TCL is input to the module 106. The rotor collective pitch command $\theta_0$ is input to the modules 106, 102, and a module 140 for generating a setpoint $\theta_0^*$ for the rotor 10, and the command Pal is input to the module 102.

In the embodiment of FIG. 6, the thrust command TCL is delivered directly to the module 101A, whereas in the embodiment of FIG. 5, this thrust command TLC is delivered to the module 105, and the drive speed setpoint RPM* delivered thereby is applied as input to the module 101.

In both embodiments of FIGS. 5 and 6, the actual speed RPM of the power transmission system is input to the module 106 for calculating the engine speed setpoint NG*; this speed RPM is also delivered to the module 101 in the embodiment of FIG. 5.

The member 105 (FIG. 5) or 100A (FIG. 6) for generating a drive speed setpoint RPM* for the drive speed RPM comprises (cf FIG. 8 and FIG. 11):

a module/member 107 that generates and outputs a reference drive speed RPMref as a function of the travel speed VTAS of the rotorcraft received as input; and a limiter 108 connected to the module 107 and sensitive to the reference drive speed RPMref delivered by the module 107, and outputting the drive speed setpoint RPM*.

Thus, the module 107 calculates the speed RPMref in application of the decreasing relationship described with reference to FIG. 4, once the speed VTAS exceeds the speed V1.

The member 106 for generating the engine speed setpoint NG* comprises (cf. FIG. 10):

a "feed forward" module/member 109 that calculates an anticipated first command (pre-command) for varying the engine speed as a function of the rotor collective pitch $\theta_0$; the module 109 serves to anticipate the increase in power made necessary by a command to increase the collective pitch;

a module/member 110 that calculates a second anticipated command for varying engine speed as a function of the thrust command TCL;

a first summing circuit 111 for adding together the first and second anticipated commands for varying engine speed and for outputting a first component NG1* of the engine speed setpoint NG*;

a comparator 114 that subtracts the drive speed RPM from the drive speed setpoint RPM*;

a regulator 113 that delivers a second component NG2* of the engine speed setpoint NG* as a function of the difference delivered by the comparator 114; this regulator may be a proportional integral (PI) regulator that generates the component NG2* serving to cancel the difference between RPM and RPM* which are presented thereto as inputs; and a summing circuit 112 that determines the engine speed setpoint NG* by adding together the first and second components NG1* and NG2*.

For a rotorcraft having (at least) two propulsion propellers 6L, 6R of variable pitch that are disposed on either side of the fuselage of the rotorcraft, the system 100 includes:

a module/member 101, 101A for generating a mean pitch setpoint $\theta_p^*$ for the mean pitch $\theta_p$ of both propellers as a function of the propulsion/thrust variation command TCL;

a module/member 102 for generating a pitch difference setpoint $\theta_d^*$ for half the pitch difference $\theta_d$ between the two propellers as a function of the rotor collective pitch variation command $\theta_0$ and as a function of the heading/yaw variation command Pal;

a summing circuit 103 for adding the mean pitch setpoint $\theta_p^*$ and the pitch difference setpoint $\theta_d^*$ and for delivering the resulting setpoint $(\theta_p^* + \theta_d^*)$ to a pitch control member for a first one of the two propellers; and a summing circuit used as a subtracter 104 for subtracting the pitch difference setpoint $\theta_d^*$ from the mean pitch setpoint $\theta_p^*$ and for delivering the resulting setpoint $(\theta_p^* - \theta_d^*)$ to a member for controlling the pitch of the second propeller.

Figure 9:
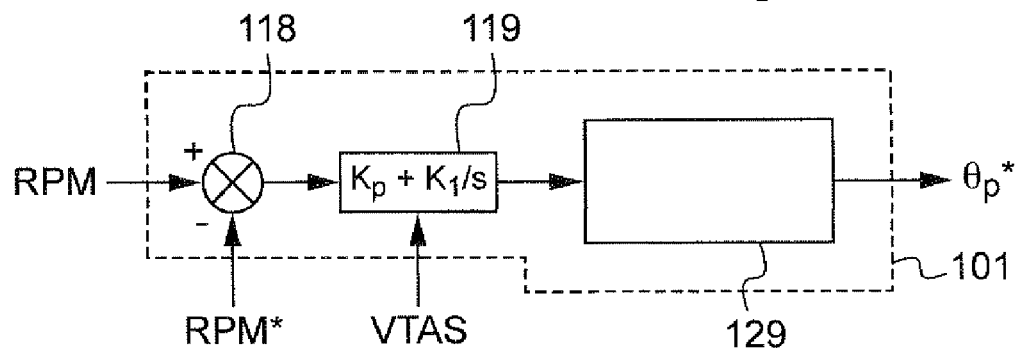
FIG. 9 is a diagram of a module for calculating a mean pitch setpoint for the propellers in a first embodiment.

In the embodiment corresponding to FIGS. 5 and 9, the member 101 for generating a mean pitch setpoint $\theta_p^*$ comprises a comparator 118 that subtracts the drive speed setpoint RPM* from the measured drive speed RPM, a module 119 that is preferably a PI regulator tending to zero the difference (RPM−RPM*) that is presented to it as input, and an output filter 129 that ensures stability in torsion for the system for transmitting power to the propellers.

The member 102 for generating a pitch half-pitch difference setpoint $\theta_d^*$ comprises (cf. FIG. 7):

a module/unit 141 for collective-yaw decoupling that receives the rotor collective pitch variation command $\theta_0$ and that delivers a pre-command for anticipating variation in the setpoint $\theta_d^*$ needed to balance the torque variation and thus the heading that results from a variation in the command $\theta_0$;

a module/unit 142 for processing a heading variation command Pal;

a summing circuit 143 connected to the decoupling unit 141 and to the processor unit 142; and a lowpass filter 144 receiving as input the sum delivered by the summing circuit 143 and delivering as output the half-pitch difference setpoint $\theta_d^*$, the filter 144 limiting the rate of variation of said setpoint $\theta_d^*$.

Figure 8:
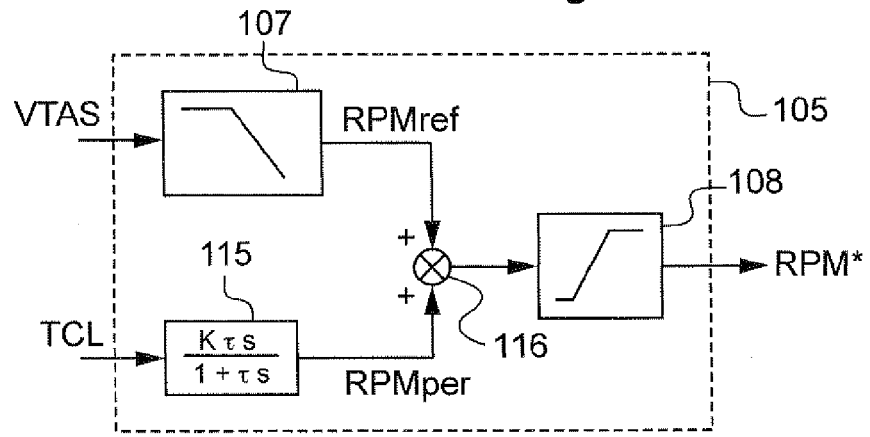
FIG. 8 is a diagram of a module for calculating a common drive speed setpoint for driving the rotor and the propellers in a first embodiment.
Figure 10:
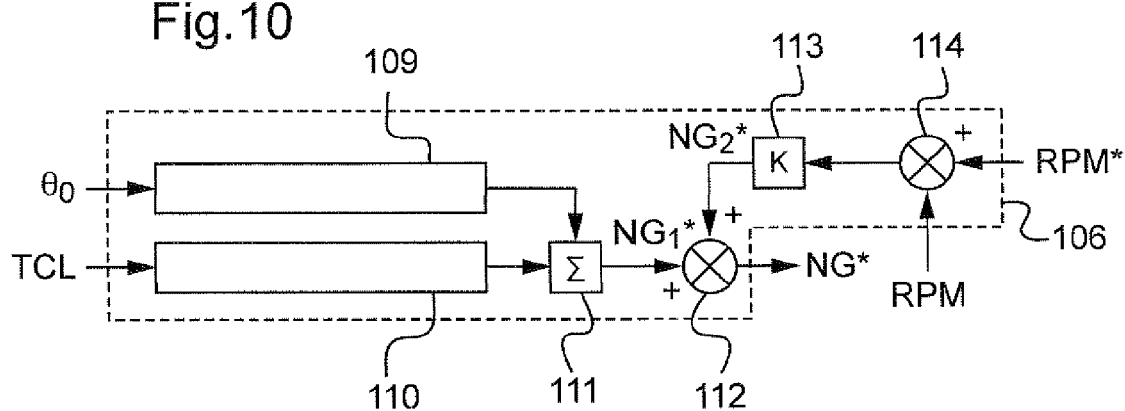
FIG. 10 is a diagram of a module for calculating a speed setpoint for the gas generator of a turbine engine.
Figure 7:
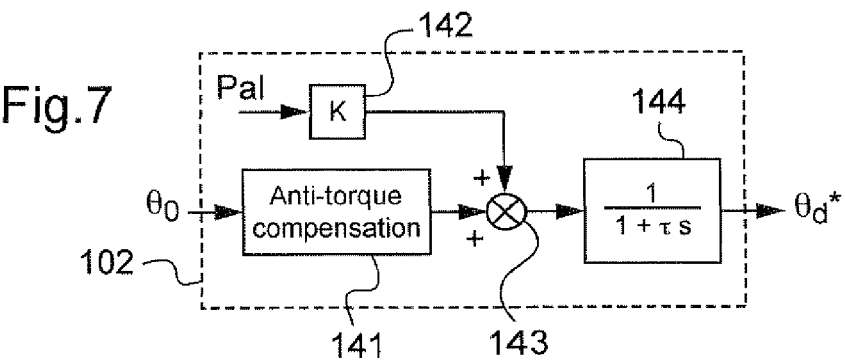
FIG. 7 is a diagram of a module for calculating the collective pitch difference for a control system of a rotorcraft having two propellers.

In the embodiment corresponding to FIGS. 5 and 8, the member 105 for generating a setpoint RPM* for the drive speed RPM further comprises:

a module/member 115 that generates a transient variation RPMper in the drive speed setpoint RPM* as a function of the propulsion/thrust variation command TCL; and a summing circuit 116 that adds the transient variation RPMper for the drive speed setpoint RPM* to the reference drive speed RPMref and that delivers said sum to the limiter 108 that delivers the drive speed setpoint RPM*.

The module 115 that acts as a highpass filter makes it possible in response to an action of the pilot on the member 121 to cause a transient increase (or decrease) in the drive speed setpoint RPM* in order to inhibit the "helicopter" regulation loop (including in particular the modules 112 to 114, FIG. 10) for a length of time sufficient for the regulation loop 101-105 for the propellers to adapt the pitch thereof. This makes it possible to avoid the helicopter type regulation opposing the variations in NG* that are needed for (indirectly) controlling variation in the pitch of the propulsion propellers.

If the increase in the TCL command is slow, the transient variation RPMper is substantially zero.

Figure 11:
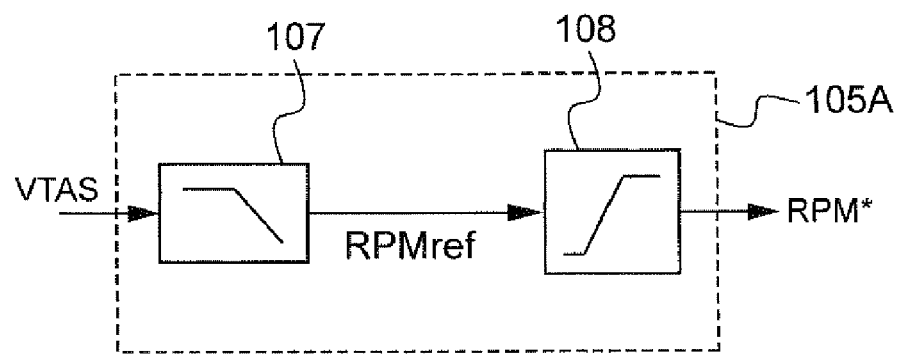
FIG. 11 is a diagram of a module for calculating a common drive speed setpoint for driving the rotor and the propellers in a second embodiment.
Figure 12:
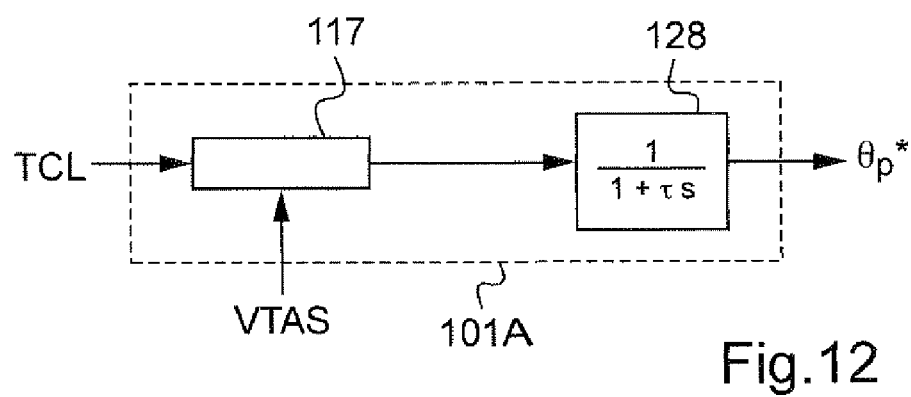
FIG. 12 is a diagram of a module for calculating a mean pitch setpoint for the propellers in a second embodiment.

In the embodiment corresponding to FIGS. 6, 11, and 12, regulation is simpler since the mean pitch of the propellers is controlled directly by means of a hydraulic servo-control and is no longer associated with propeller speed. However it is then necessary to limit the rate of variation in the mean pitch command, in particular at high forward speed VTAS, since the transient variation in torque that would result therefrom could damage the propellers. The mean pitch setpoint $\theta_p^*$ is thus generated from the position TCL of the propeller thrust control lever 121; variation in the command is limited by the limiter module 117 as a function, where appropriate, of the travel speed VTAS; the rate of this variation is limited by a lowpass filter 128 (FIG. 12) and then the resulting command is transmitted to the propellers (via summing circuits 103, 104).

In both embodiments, collective-yaw decoupling and steering control are implemented by applying a differential collective pitch $\theta_d^*$ to the left and left propellers.

Furthermore, the direct "pitch-fuel" "pre-commands" 109, 110 are provided for the rotor and the propellers in order to attenuate (by anticipation) variations in the speed RPM that could result from rapid variations in the pitch command.

Naturally, the present invention is capable of numerous variations concerning its implementation. In particular, it is important to observe that the invention as described relates in particular to a hybrid helicopter presenting a total weight of about 8 t. Nevertheless, this invention is applicable to any rotorcraft of arbitrary weight, from a lightweight drone for example up to a rotorcraft of very large tonnage. Although several embodiments are described above, it will readily be understood that it is not possible to identify exhaustively all possible embodiments. It is naturally possible to replace any of the means described by equivalent means without going beyond the ambit of the present invention.

What is claimed is:

1. A system for controlling a rotorcraft having a rotor, at least one variable-pitch propulsion propeller, and a motor for driving the rotor and the at least one variable-pitch propulsion propeller, the system comprising:
    a member (101, 101A, 102, 103, 104) configured to generate a propeller pitch setpoint ($\theta_p^* + \theta_d^*$, $\theta_p^* - \theta_d^*$) as a function at least of a variation thrust command (TCL);
    a member (105, 105A) configured to generate a drive speed setpoint (RPM*) for a drive speed (RPM) of the rotor and the at least one variable-pitch propulsion propeller, as a function at least of a travel speed (VTAS) of the rotorcraft and where appropriate as a function of ambient temperature; and
    a member (106) configured to generate an engine speed setpoint (NG*) for an engine speed as a function at least of the variation thrust command (TCL), of the drive speed setpoint (RPM*), and of a rotor collective pitch command ($\theta_0$);
    wherein the member (106) configured to generate the engine speed setpoint (NG*) includes:
        a member (109) configured to generate a first anticipated command for varying engine speed as a function of the rotor collective pitch command ($\theta_0$);
        a member (110) configured to generate a second anticipated command for varying engine speed as a function of the variation thrust command (TCL);
        a first summing circuit (111) for adding together the first and second anticipated commands for varying engine speed, and for outputting a first component (NG1*) of the engine speed setpoint (NG*); and
        a unit (112, 113, 114) configured to generate the engine speed setpoint (NG*) as a function of the first component (NG1*), of the drive speed setpoint (RPM*), and of a measurement of the drive speed (RPM).

2. The system according to claim 1, in which the member (105, 105A) configured to generate the drive speed setpoint (RPM*) for the drive speed (RPM) comprises:
    a member (107) configured to generate a reference drive speed (RPMref) as a function of the travel speed (VTAS) of the rotorcraft; and
    a limiter (108) sensitive to the reference drive speed (RPMref) and delivering the drive speed setpoint (RPM*).

3. The system according to claim 1, for a rotorcraft having two variable-pitch propulsion propellers that are disposed on either side of the fuselage of the rotorcraft, the system comprising:
    a member (101, 101A) configured to generate a mean pitch setpoint ($\theta_p^*$) for the mean pitch ($\theta_p$) of the two variable-pitch propulsion propellers as a function of the variation thrust command (TCL);
    a member (102) configured to generate a pitch difference setpoint ($\theta_d^*$) for half the difference in pitch ($\theta_d$) between the two variable-pitch propulsion propellers as a function of the rotor collective pitch variation command ($\theta_0$) and of a heading/yaw variation command (Pal);
    a summing circuit (103) for adding together the mean pitch setpoint ($\theta_p^*$) and the pitch difference setpoint ($\theta_d^*$), and for delivering the resulting setpoint ($\theta_p^* + \theta_d^*$) to a member for controlling the pitch of a first one of the two propellers; and
    a summing circuit used as a subtracter (104) for subtracting the pitch difference setpoint ($\theta_d^*$) from the mean pitch setpoint ($\theta_p^*$) and for delivering the resulting setpoint ($\theta_p^* - \theta_d^*$) to a pitch control member of the second propeller.

4. The system according to claim 3, in which the member (102) configured to generate a pitch difference setpoint ($\theta_d^*$) for half the pitch difference comprises:
    a decoupling unit (141) for collective-yaw decoupling, which decoupling unit receives the rotor collective pitch variation command ($\theta_0$);
    a processor unit (142) for processing a heading variation command (Pal);
    a summing circuit (143) connected to the decoupling unit and to the processor unit; and
    a lowpass filter (144) receiving as input the sum delivered by the summing circuit and delivering as output the pitch difference setpoint ($\theta_d^*$) for half the pitch difference.

5. The system according to claim 2, in which the member (105) configured to generate the drive speed setpoint (RPM*) for the drive speed (RPM) further comprises:
    a member (115) configured to generate a transient variation (RPMper) in the drive speed setpoint (RPM*) as a function of the variation thrust command (TCL); and
    a summing circuit (116) for adding the transient variation (RPMper) for the drive speed setpoint (RPM*) to the reference drive speed (RPMref) and for delivering said sum to the limiter (108) that delivers the drive speed setpoint (RPM*).

6. A non-transitory computer readable medium for a rotorcraft having a rotor, at least one variable-pitch propulsion propeller, and a motor for driving the rotor and the at least one variable-pitch propulsion propeller, the non-transitory computer readable medium comprising:
    a code segment for generating a propeller pitch setpoint ($\theta_p^* + \theta_d^*$, $\theta_p^* - \theta_d^*$) as a function at least of a thrust variation command (TCL);
    a code segment for generating a drive speed setpoint (RPM*) for a drive speed (RPM) of the rotor and of the at least one variable-pitch propulsion propeller, as a function at least of a travel speed (VTAS) of the rotorcraft; and
    a code segment for generating an engine speed setpoint (NG*) for an engine speed, as a function at least of the variation thrust command (TCL), of the drive speed setpoint (RPM*), and of a rotor collective pitch command ($\theta_0$);
    wherein the code segment for generating the engine speed setpoint (NG*) includes:
        a code segment for generating a first anticipated command for varying engine speed as a function of the rotor collective pitch command ($\theta_0$);
        a code segment for generating a second anticipated command for varying engine speed as a function of the variation thrust command (TCL);
        a code segment for adding together the first and second anticipated commands for varying engine speed, and for outputting a first component (NG1*) of the engine speed setpoint (NG*); and
        a code segment for generating the engine speed setpoint (NG*) as a function of the first component (NG1*), of the drive speed setpoint (RPM*), and of a measurement of the drive speed (RPM).

7. The non-transitory computer readable medium according to claim 6, in which the code segment for generating the drive speed setpoint (RPM*) for the drive speed (RPM) comprises a code segment for generating a reference drive speed (RPMref) that decreases as a function of the travel speed (VTAS) of the rotorcraft when the travel speed VTAS exceeds a determined speed V1.

8. A rotorcraft including a rotor, at least one variable-pitch propulsion propeller, and a motor for driving the rotor and the at least one variable-pitch propulsion propeller, the rotorcraft including the control system according to claim 1.

9. The rotorcraft according to claim 8, including two variable-pitch propulsion propellers that are disposed on either side of the fuselage of the rotorcraft, which rotorcraft does not have an anti-torque rotor and does include a direct driving power transmission system between the engine and the rotor and the propellers.

10. A system for controlling a rotorcraft having a rotor, at least one variable-pitch propulsion propeller, and a motor for driving the rotor and the at least one variable-pitch propulsion propeller, the system comprising:
a member (101, 101A, 102, 103, 104) configured to generate a propeller pitch setpoint ($\theta_p^* + \theta_d^*$, $\theta_p^* - \theta_d^*$) as a function at least of a variation thrust command (TCL);
a member (105, 105A) configured to generate a drive speed setpoint (RPM*) for a drive speed (RPM) of the rotor and the at least one variable-pitch propulsion propeller, as a function at least of a travel speed (VTAS) of the rotorcraft and where appropriate as a function of ambient temperature; and
a member (106) configured to generate an engine speed setpoint (NG*) for an engine speed as a function at least of the variation thrust command (TCL), of the drive speed setpoint (RPM*), and of a rotor collective pitch command ($\theta_0$);
wherein the member (105, 105A) configured to generate the drive speed setpoint (RPM*) for the drive speed (RPM) includes:
a member (107) configured to generate a reference drive speed (RPMref) as a function of the travel speed (VTAS) of the rotorcraft;
a limiter (108) sensitive to the reference drive speed (RPMref) and delivering the drive speed setpoint (RPM*);
a member (115) configured to generate a transient variation (RPMper) in the drive speed setpoint (RPM*) as a function of the variation thrust command (TCL); and
a summing circuit (116) for adding the transient variation (RPMper) for the drive speed setpoint (RPM*) to the reference drive speed (RPMref) and for delivering said sum to the limiter (108) that delivers the drive speed setpoint (RPM*).

* * * * *